Dec. 11, 1934.  F. H. HOWLETT  1,984,216
VEGETABLE SLICER AND SHREDDER
Filed May 18, 1931  2 Sheets-Sheet 1
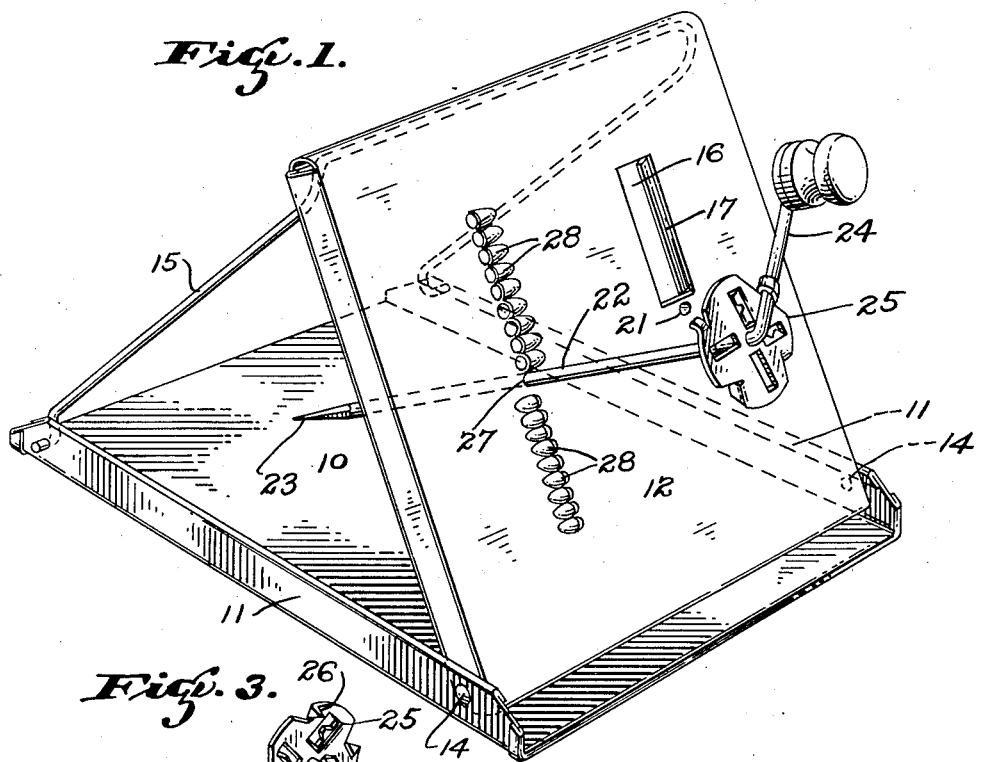
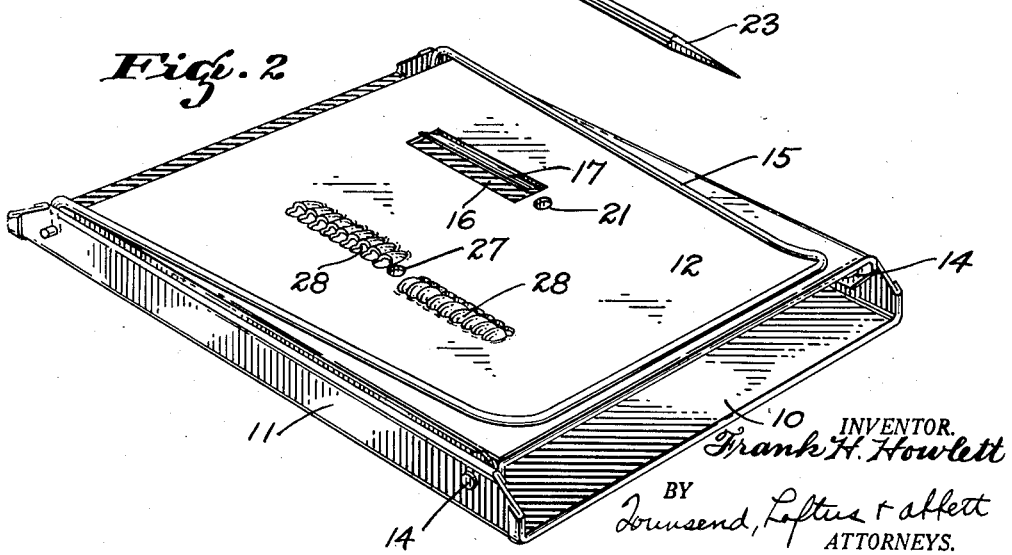
INVENTOR.
Frank H. Howlett
BY
Townsend, Loftus & Abbett
ATTORNEYS.

Dec. 11, 1934.  F. H. HOWLETT  1,984,216
VEGETABLE SLICER AND SHREDDER
Filed May 18, 1931  2 Sheets-Sheet 2
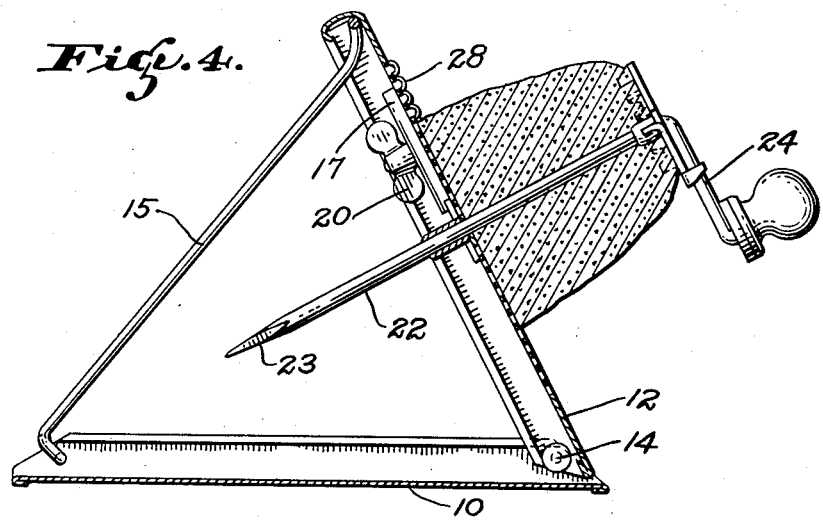
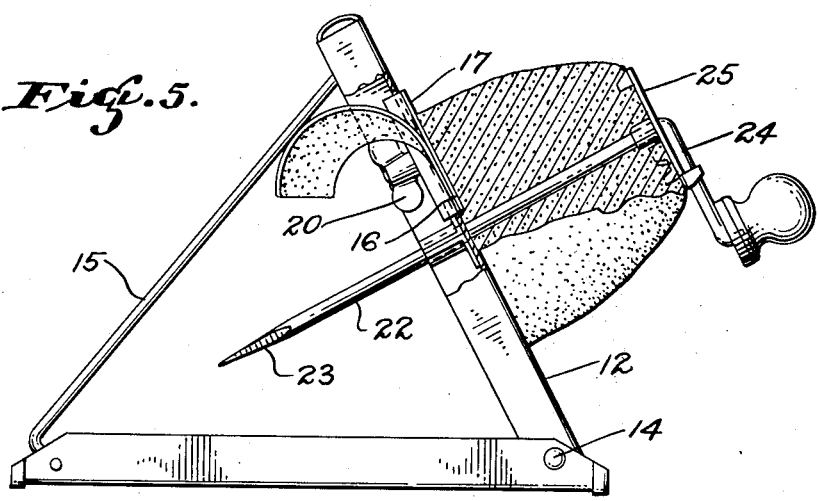
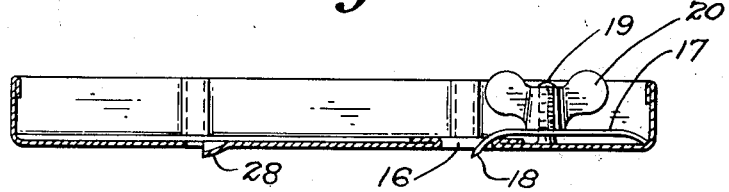
INVENTOR.
Frank H. Howlett
BY
Trunsurd, Loftus & Ahkett
ATTORNEYS.

Patented Dec. 11, 1934

1,984,216

UNITED STATES PATENT OFFICE 1,984,216

VEGETABLE SLICER AND SHREDDER

Frank H. Howlett, Oakland, Calif.

Application May 18, 1931, Serial No. 538,098

2 Claims. (Cl. 146—166)

This invention relates to culinary implements and particularly pertains to a vegetable slicer and shredder.

It is the principal object of the present invention to provide an improved device of the character described which is of simple and inexpensive construction and capable of use in efficiently and expeditiously shredding or slicing vegetables.

In carrying the invention into practice I provide a spindle upon which the vegetable to be sliced or shredded may be impaled. This spindle may be rotatably engaged with a plate in operative position relative to either shredding or slicing blades so that upon rotation of the spindle the vegetable may be sliced or shredded as desired.

The invention is exemplified in the following description and illustrated by way of example in the accompanying drawings, in which:

Fig. 1 is a perspective view of a vegetable slicer and shredder embodying my invention, illustrating the same ready for use.

Fig. 2 is a perspective view of the device in collapsed or folded position.

Fig. 3 is a perspective view of the crank spindle upon which the vegetable is impaled when the device is in operation.

Fig. 4 is a view in vertical longitudinal section through the device illustrated in Fig. 1.

Fig. 5 is a view similar to Fig. 4.

Fig. 6 is a transverse sectional view through the plate showing the manner in which the slicer and shredder is mounted.

Referring to the accompanying drawings, particularly to Figs. 1 to 6 inclusive, I disclose a vegetable slicer and shredder comprising a flat tray 10 having vertical side members 11. Overlying the tray is a plate 12 of a width enabling it to nest within the sides of the tray 10. The marginal edges of the sides and one end of the plate 12 are bent over as illustrated. At the other end of the plate 12 it is pivotally connected to the sides of the tray 10 at one end of the latter by means of suitable pivot pins 14. This construction enables the plate 12 to be nested within the tray when the device is not in use or to be arranged substantially vertically from the tray when the device is in operation utilizing the tray 10 as a base.

At the end of the tray opposite the point of pivotal connection between the tray and plate 12 is a hinged bail 15. The terminals of this bail are outwardly directed and pivotally connected with the sides of the tray 10. This hinged or pivotal point of connection between the bail 15 and the tray 10 is, of course, as described, at the end of the tray opposite the end to which the plate 12 is pivoted. The bail is of dimensions enabling its free end to engage the flanged end of the plate 12 and support the latter in an angular upright position as illustrated in Fig. 1. When the device is collapsed or folded, the plate 12 nests within the side members 11 of the tray 10 and the bail 15 lies flatwise over the plate 12 as illustrated in Fig. 2. In this folded or collapsed position the device will occupy but a minimum of space.

Formed in the plate 12 is an aperture 16. On the under surface of the plate 12 is a cutter blade 17 having a cutting edge 18 which projects through the aperture 16. The cutter blade 17 is adjustably secured to the plate 12 by means of a threaded stud 19 which projects through a slotted opening in the cutter blade 17 and is fitted with a wing nut 20.

Contiguous to one end of the aperture 16 is a guide opening 21 extending transversely through the plate. This guide opening rotatably receives an impaled spindle 22. The spindle 22 may be removably engaged with the guide opening 21. The spindle 22 is sharpened at one end as at 23 so that a vegetable may be impaled on the spindle. The opposite end of the spindle is bent right angularly to form a crank handle 24 by means of which the spindle may be revolved when engaged with the guide opening 21. Adjacent the end of the spindle on which the crank handle 24 is formed is a disc 25 which is secured on the spindle. This disc 25 is formed with down turned sharpened prongs or tangs 26 to engage a vegetable impaled on the spindle 22 to prevent relative rotation between the spindle and such vegetable.

Also formed on the plate 12 is a second guide opening 27 similar to the guide opening 21. At opposite sides of this guide opening 27 the plate is formed with a pair of shredder blades 28 which are pressed out of the plate itself. The formation of these shredder blades may be as desired and in fact the shredder blades may be separate from the plate if desired.

In operation of the form of the device shown in Fig. 1, after the vegetable has been impaled on the spindle 22 and engaged with the tangs 26 of the disc 25, the sharpened end of the spindle is projected through the guide opening 21 if it is desired to slice the vegetable until the vegetable engages the surface of the plate 12. The crank handle 24 is then revolved and the vegetable maintained in contact with the plate 12. The revolving of the hand crank will, of course, cause the slicing blade to engage the vegetable and slice the same.

If it is desired to shred the vegetable rather than slice it, the spindle 22 is engaged with the guide opening 27 and upon similar operation of the spindle 22 the shredding blades 28 will shred the vegetable.

It is obvious from Fig. 1 that as the vegetable is sliced or shredded, the slices or shreds of vegetable will deposit on the tray 10 from which, of course, they may be readily removed if desired.

In the finished article the entire device shown in Fig. 1 may be tinned or plated if desired or constructed of some material suitable in appearance.

It is apparent that in the operation of the slicer and shredder that the fingers or hands of the operator are not in any way jeopardized.

From the foregoing it is obvious that I have provided a very simple and efficient vegetable slicer and shredder which is of simple and inexpensive construction and capable of use in expeditiously slicing and shredding vegetables.

While I have shown the preferred form of my invention, it is to be understood that various changes may be made in its construction by those skilled in the art without departing from the spirit of the invention as defined in the appended claims.

Having thus described my invention, what I claim and desire to secure by Letters Patent is:

1. As an article of manufacture, a tray, a plate pivotally connected at one end to one end of the tray whereby it may be disposed flatwise within the tray or arranged in an upright position relative thereto, means for supporting said plate in an upright position, said plate having an aperture formed therethrough, a slicing blade secured to the plate contiguous to the aperture, said plate having a guide opening adjacent said aperture, shredding means carried by the plate, said plate being formed with a guide opening adjacent said shredding means, a spindle removably and rotatably engageable with either guide opening and upon which a vegetable may be impaled and nonrotatably held, said spindle having a crank arm at one end thereof whereby a vegetable impaled on the spindle when the spindle is engaged with the guide opening may be revolved.

2. As an article of manufacture, a plate having an aperture formed therethrough, a slicing blade secured to the plate contiguous to the aperture, said plate having a guide opening adjacent said aperture, shredding means carried by the plate, said plate being formed with a guide opening adjacent said shredding means, a spindle removably and rotatably engageable with either guide opening and upon which a vegetable may be impaled and nonrotatably held, said spindle having a crank arm at one end thereof whereby a vegetable impaled on the spindle may be revolved when the spindle is engaged with one of the guide openings.

FRANK H. HOWLETT.